Figure 1:
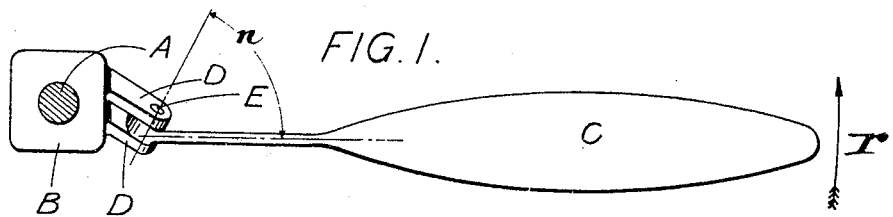

June 23, 1931.  J. DE LA CIERVA  1,811,303

AIRCRAFT WITH ROTATIVE WINGS

Filed Nov. 1, 1926

Inventor.
J. de la Cierva
by Futurstonbaugh Co
Attys.

Patented June 23, 1931

1,811,303

UNITED STATES PATENT OFFICE

JUAN DE LA CIERVA, OF MADRID, SPAIN, ASSIGNOR, BY MESNE ASSIGNMENTS, TO AUTOGIRO COMPANY OF AMERICA, OF PHILADELPHIA, PENNSYLVANIA, A CORPORATION OF DELAWARE

AIRCRAFT WITH ROTATIVE WINGS

Application filed November 1, 1926, Serial No. 145,654, and in Great Britain November 24, 1925.

This invention relates to aircraft embodying a freely rotative hinged-wing system of the character described in my U. S. patent specification No. 1,590,497 and is more particularly directed to improvements in the methods of mounting the rotative wings, that is to say in jointing said wings to their common axis of rotation, with the object of automatically producing a variation of the aerodynamical incidence of the wings in different angular positions around the circle of rotation.

In revolving wing systems, the variation in pressure due to the difference in the speed of the advancing and the retreating wings relatively to the air stream produces a flapping or beating movement, the advancing wing rising by reason of the greater pressure thereon whilst the retreating wing descends due to diminished pressure.

This results in the wings working at widely varying incidence in different angular positions and it is the primary object of the present invention to diminish this range.

This object is attained according to the present invention by arranging the axes of the hinge joints of the wings in such a manner that a wing in rising is caused to decrease its positive incidence and in descending, to increase its incidence. In this manner an effect due to the arrangement of the hinge-joint is superimposed upon the normal effect of changing incidence due to the difference in pressure on the wings, resulting in diminishing the range of incidence throughout the revolution.

The present invention is carried into effect primarily by setting the axis of the hinge joint of each wing, viewed in plan, at an inclination to the axis of symmetry of the wing, such that the smaller angle with said axis of symmetry is forwardly disposed with regard to the direction of rotation of the system.

A similar proposal has already been made to incline the joints of the blades in a pair of power-driven lifting propellers superposed one upon the other and rotating in opposite directions.

This mere inclination in plan, however, although it suffices to produce a damping effect upon the range of incidence, is open to the objection that the wings in rising and falling change their relative position in plan thereby making the system asymmetrical and setting up vibratory stresses in the wings.

Further according to the present invention and to obviate this objection the axes of the hinge joints, already inclined in plan, are inclined in elevation to an extent sufficient to restore the swinging movement of the axis of symmetry of each wing substantially to a plane, which also contains or is parallel to the general axis of rotation of the system. The actual path traversed by the axis of symmetry of a wing is slightly arcuate but the horizontal deviation is so small as to be negligible.

A constructional form of the present invention is illustrated in the accompanying drawings, in which:—

Fig. 1 is a plan view, and

Figure 2:
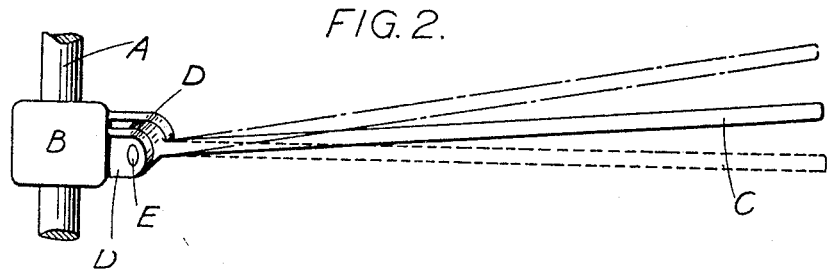

Fig. 2 a view in elevation of a wing mounted in accordance with the invention.

Figure 3:
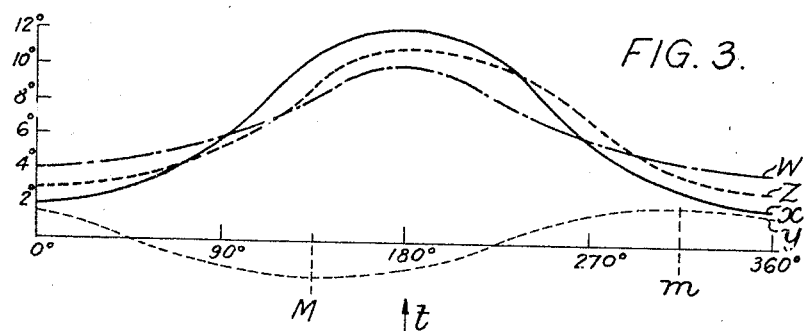
Figure 4:
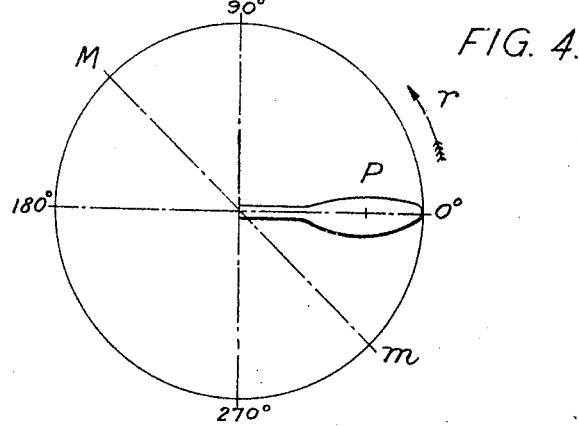

Figs. 3 and 4 demonstrate graphically the effect of inclining the hinge-joints in accordance with the invention.

In Fig. 1 the arrow $r$ indicates the sense of rotation, and in Fig. 2 the wing is receding.

A denotes a shaft constituting the general axis of rotation of the wing system, and B a supporting member for the wings C. D are bearings projecting from the member B and carrying the pin E which constitutes the axis of the hinge joint by which the wing is secured. Viewed in plan as in Fig. 1 the pin E is inclined with respect to the longitudinal axis of symmetry of the wing C, instead of being set perpendicular thereto as heretofore, in such wise that the smaller angle $n$ with said axis of symmetry is forwardly disposed with regard to the direction of rotation, indicated by the arrow $r$. The pin E is also inclined, viewed in elevation as in Fig. 2, to the general axis of rotation A. The amount of inclination obviously depends upon the range of incidence normally adopted by the wings in rising and falling, which in turn is governed by the aerodynamical characteristics of the wings.

In the construction illustrated, the prolongation of the path of movement of the wing's longitudinal axis of symmetry does not coincide with the axis of the shaft A, but is substantially parallel thereto. It will be obvious however that by displacing the bearings D forwardly such coincidence may be obtained.

Referring now to Figs. 3 and 4:—

The arrow $t$ in the latter figure indicates the direction of translation and the arrow $r$ the rotational sense of the system. Fig. 3 is a development of Fig. 4 in which angular positions are plotted against incidence.

The curves represent incidences of a section P of the wing at different angular positions.

The harmonic curve $w$ represents the case of rigid rotating wings, that is to say wings not hingedly jointed to the centre of rotation and for this reason the curve $w$ is flatter than the curve $x$, also a harmonic curve, representing the case of wings hingedly jointed in the normal manner i. e. with the axes of the hinge joint perpendicular to the axis of symmetry of the wing.

M and $m$ mark respectively the highest and lowest positions relatively to the mean plane of rotation assumed by the wing in flight, and it is notable that these positions do not coincide with the angular positions of 90° and 270° respectively, the displacement being due to the inertia of the wing which carries the rising and descending motion past the line of translation in each case.

The curve $y$ represents the effect due to the inclination of the hinge joint in accordance with the invention, and, since the maximum change of incidence is obtained at the highest and lowest position of the wing, the points of maximum deviation are displaced relatively to the curve $x$.

The curve $z$ therefore represents the geometrical sum of the curves $x$ and $y$ whence it will be seen that the range of incidence in a complete revolution is diminished by the inclination of the hinge joint and it will be readily appreciated that the general efficiency of the system is improved thereby.

What I claim is:—

1. In an aircraft, a sustaining unit comprising a plurality of aerofoils positioned radially about a common substantially vertical axis, and means for mounting the aerofoils including means for permitting them to rotate freely about their axis under the action of relative air flow and means for permitting them individually to assume during rotation a position of equilibrium under the lift forces and centrifugal forces of rotation set up by said airflow, said last means including a flexible joint for each aerofoil having an axis set at an angle oblique to the longitudinal axis of the aerofoil.

2. In an aircraft, a sustaining unit comprising a plurality of aerofoils positioned radially about a common substantially vertical axis, and means for mounting the aerofoils including means for permitting them to rotate freely about their axis under the action of relative air flow and means for permitting them individually to assume during rotation a position of equilibrium under the lift forces and centrifugal forces of rotation set up by said airflow, said last means including a flexible joint for each aerofoil having an axis set at an angle oblique to a plane perpendicular to the common axis of rotation of the aerofoils.

3. In an aircraft, a sustaining unit comprising a plurality of aerofoils positioned radially about a common substantially vertical axis, and means for mounting the aerofoils including means for permitting them to rotate freely about their axis under the action of relative air flow and means for permitting them individually to assume during rotation a position of equilibrium under the lift forces and centrifugal forces of rotation set up by said airflow, said last means including a flexible joint for each aerofoil having an axis set at an angle oblique both to the longitudinal axis of the aerofoil and to a plane perpendicular to the common axis of rotation of the aerofoils.

JUAN DE LA CIERVA.